United States Patent
Dry et al.

(10) Patent No.: US 6,929,304 B1
(45) Date of Patent: Aug. 16, 2005

(54) FLIP UNDER CELL PHONE HOLDER

(75) Inventors: Alan Dry, Grosse Pointe Woods, MI (US); Bogdan Radu, Dearborn, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/868,161

(22) Filed: Jun. 14, 2004

(51) Int. Cl.[7] .............................. B60R 7/00; A47C 7/62
(52) U.S. Cl. ..................... 296/37.8; 224/539; 224/926; 224/553; 224/929; 297/188.16; 379/454
(58) Field of Search .......................... 296/37.8, 24.34, 296/24.32; 224/539, 926, 553, 929; 297/188.14, 297/188.15, 188.16; 379/446, 454, 455

(56) References Cited

U.S. PATENT DOCUMENTS

| | | | |
|---|---|---|---|
| 4,611,734 A | | 9/1986 | Luecking et al. |
| 5,024,411 A | * | 6/1991 | Elwell ...................... 248/311.2 |
| 5,316,368 A | * | 5/1994 | Arbisi .................... 297/188.19 |
| 5,390,976 A | * | 2/1995 | Doughty et al. ............. 297/115 |
| 5,556,017 A | * | 9/1996 | Troy .......................... 224/549 |
| 5,562,331 A | * | 10/1996 | Spykerman et al. ... 297/188.16 |
| 5,836,496 A | | 11/1998 | Levin et al. |
| 5,853,220 A | * | 12/1998 | Gulich et al. .......... 297/188.16 |
| 5,863,089 A | * | 1/1999 | Ignarra et al. ............. 296/37.8 |
| 5,996,866 A | | 12/1999 | Susko et al. |
| 6,062,518 A | | 5/2000 | Etue |
| 6,491,194 B2 | | 12/2002 | Marvin |
| 6,616,205 B2 | * | 9/2003 | Bruhnke et al. .......... 296/37.8 |
| 6,616,206 B2 | | 9/2003 | Luginbill et al. |
| 2002/0100782 A1 | | 8/2002 | Marvin |

* cited by examiner

Primary Examiner—Joseph D. Pape
(74) Attorney, Agent, or Firm—Bill Panagos

(57) ABSTRACT

A cell phone storage pocket for a vehicle console comprising a hinged armrest, a flip under tray, and a hinged mechanism. This invention provides secure storage for a driver or passenger's cell phone while maintaining it in an easy to read location. Also, this cell phone storage pocket allows a user to keep the cell in an accessible location which can lead to safer driving habits.

7 Claims, 2 Drawing Sheets

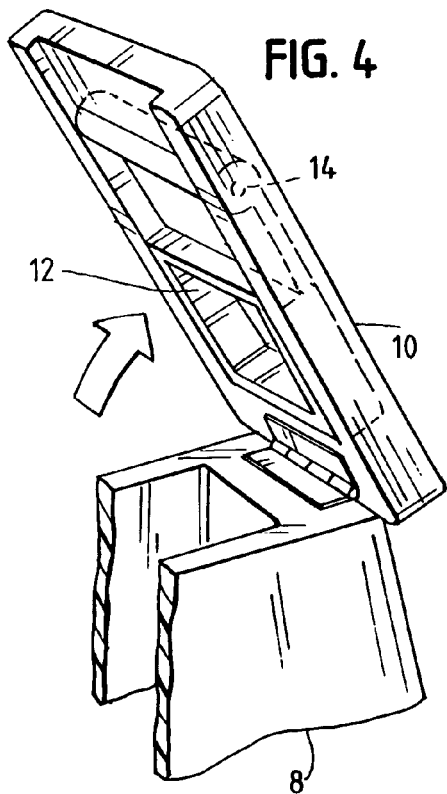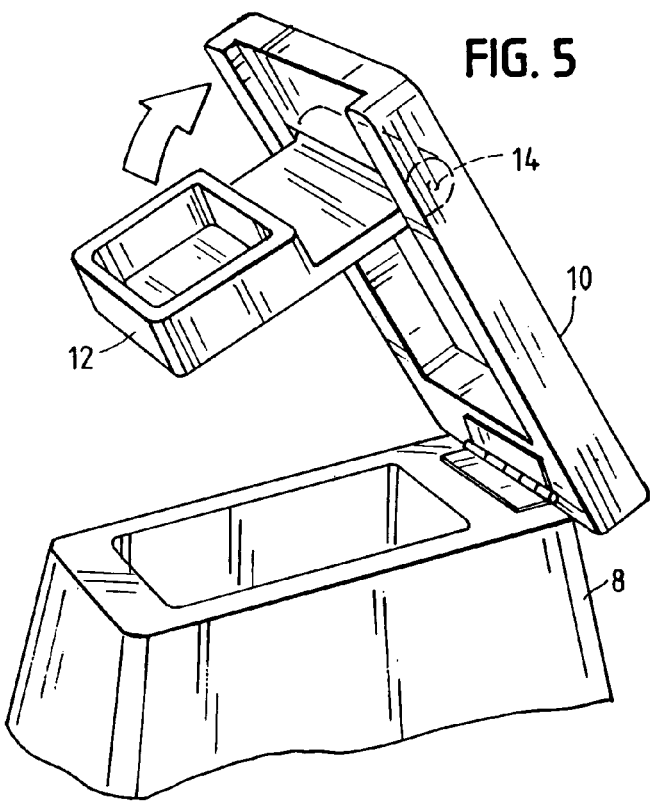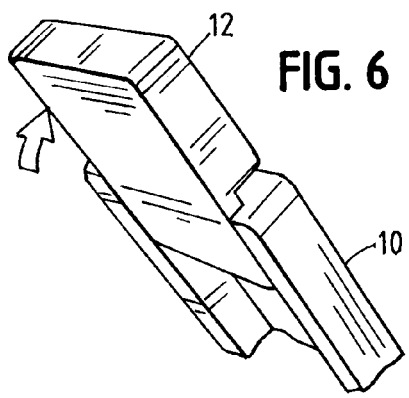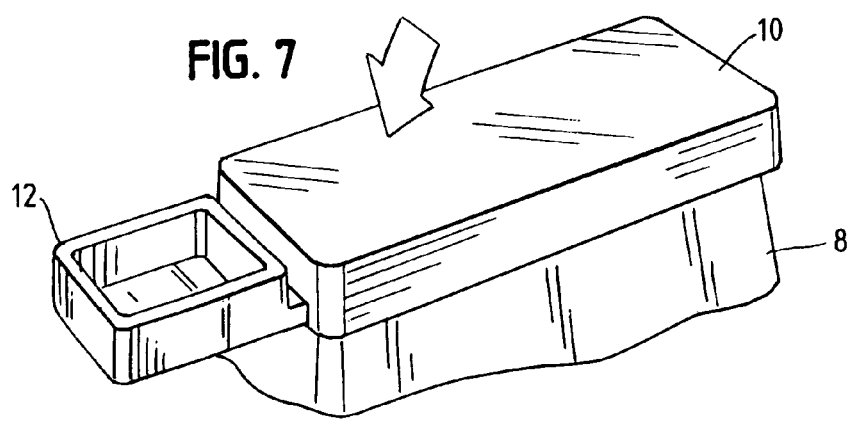

FLIP UNDER CELL PHONE HOLDER

FIELD OF THE INVENTION

This invention relates to a cell phone storage pocket in a vehicle console. More specifically, it relates to a flip under tray that is rotatably mounted to the hinged armrest of the vehicle console.

BACKGROUND OF THE INVENTION

Cell phone holders are widely used in motor vehicles. They are very popular among motor vehicle consumers because those consumers want a place to keep their phone safely secured in an easy to locate position if it is necessary to use while driving. It is well known that it is unsafe for a driver to be searching for his or her phone while driving because that distracts from the concentration needed to pay close attention to the road. So consumers have demanded that holder be available for use in their vehicles.

There are cell phone holders that utilize the vehicle console that is known in prior art. In particular, U.S. Pat. Nos. 6,616,205 B2, 5,996,866, 5,836,496, and 5,556,017 all pertain to cell phone holders utilizing a vehicle console. These devices attempt to meet the needs of drivers with cell phones, but none of them fully address the need to have a cell phone holder in a position whereby it is easily readable. Almost all cell phones today utilize some sort of caller identification. It is ideal for phone users to be able to see the number on the screen before deciding whether or not to answer. For drivers who are calling out on there phones, it would be possible to dial and see the screen with out having to move the phone. Many states either have enacted or are considering enacting laws that would mandate a hands free system of using the cell phone while driving. If a driver can easily hit a button on the phone without fumbling for the phone or straining to see the phone display, then the driver is free to concentrate on the road and be in compliance with these laws.

This invention promotes easy storage, easy view of the phone display, and therefore safer driving by utilizing a tray that keeps the cell phone in an easily accessible location.

SUMMARY OF THE INVENTION

A cell phone storage pocket for a vehicle console, said vehicle console comprising: a hinged armrest and a flip under tray. The flip under tray is rotatably mounted to the hinged armrest by a hinged mechanism. The hinged mechanism is fully usable and unbroken at all times.

The flip under tray is deployed by lifting open the hinged armrest that is over the vehicle console and rotating the flip under tray out from the hinged armrest. The flip under tray rotates about the hinged mechanism. The hinged armrest is then returned to its position over the vehicle console. While deployed, objects placed in the flip under tray are safely retained and are located in a position that is level to the front of the hinged armrest and are easily readable by the vehicle passengers.

The flip under tray is stowed by lifting open the hinged armrest and rotating the flip under tray into the hinged armrest about the hinged mechanism. The hinged armrest can them be places back over the vehicle console.

DETAILED DESCRIPTION OF THE DRAWINGS

FIG. 4 depicts the first step in deploying the flip under tray; the hinged armrest is raised.

FIG. 5 depicts the flip under tray beginning to rotate out from the hinged armrest about the hinged mechanism.

FIG. 6 depicts the flip under tray reaching its fully deployed position.

FIG. 7 depicts the flip under tray fully deployed and the hinged armrest closed over the vehicle console.

DETAILED DESCRIPTION OF THE PREFERRED EMBODIMENT

Figure 1:
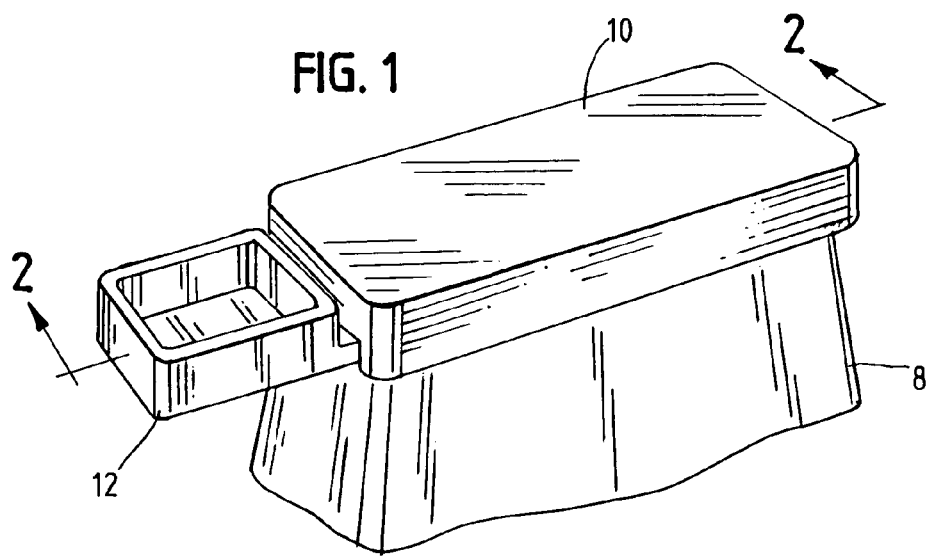
FIG. 1 depicts the flip under tray in its deployed position with the hinged armrest returned to its position over the vehicle console.

FIG. 1 depicts this cell phone storage pocket completely deployed. This cell phone storage pocket for a vehicle console 8 comprises a hinged armrest 10, a flip under tray 12, and a hinged mechanism 14. The flip under tray 12 is rotatably mounted to the hinged armrest 10 of the vehicle console 8 by way of the hinged mechanism 14.

When the driver or passenger of the vehicle desires to use this invention, it is easily deployed by lifting open the hinged armrest 10 and rotating the flip under tray 12 out from the hinged armrest 10. FIGS. 4–7 depict this movement. Once the flip under tray 12 is fully deployed, the hinged armrest 10 can be closed once again over the vehicle console 8. In its deployed position, the flip under tray 12 can safely hold one's cell phone forward of the hinged armrest 10 in a position that easily readable by the front seat passengers. The flip under tray 12 in its deployed position will be positioned level with the front of the hinged armrest 10.

This invention is robust in its design. If an excessive downward force is pressed onto the flip under tray 12, it will not break. Instead, the flip under tray 12 will press down on the vehicle console and push up against the under side of the hinged armrest 10. This is an important feature because it is not unusual for parts in a vehicle to suffer from forces that may bear down on them. Parts, such as this flip under tray 12, need to be able to effectively withstand these forces.

Also, this invention can withstand the load of one's arm resting on the hinged armrest 10 while hitting the keys on the cell phone. This weight of one's arm or other materials placed on top of the hinged armrest 10 will simply press the flip under tray 12 firmly against the hinged armrest 10 and further supporting the flip under tray 12.

While this invention anticipates use of the flip under tray 12 for safe retention of a cell phone, other devices can also be safely retained. PDA's, GPS systems, or other devices can also be safely held in the tray and be easily read from its retained position.

When the flip under tray 12, is not needed in its deployed position, it is very easily stowed. The hinged armrest 10 is simply raised and the flip under tray 12 is rotated under about its hinged mechanism 14 and held under the hinged armrest 10. The flip under tray 12 is safely and securely retained in this stowed position. The hinged armrest 10 is then returned to its position over the vehicle console 8.

Figure 2:
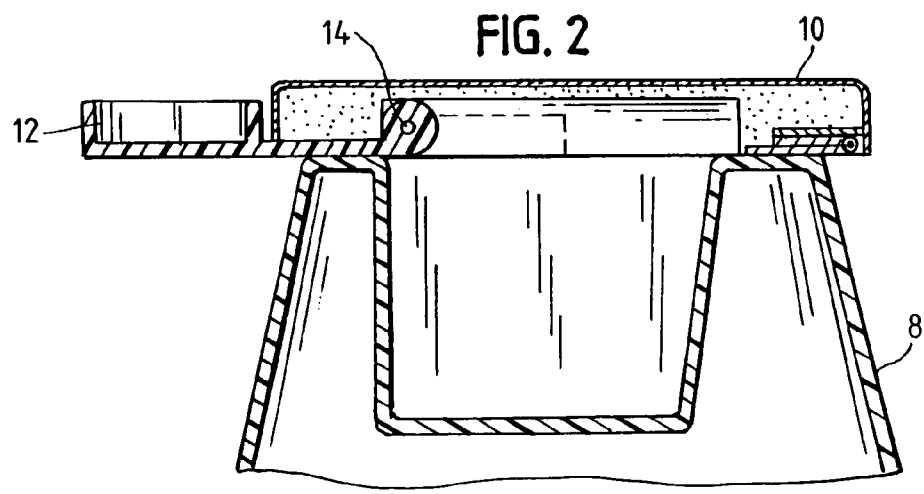
FIG. 2 depicts a cross-sectional view of the deployed flip under tray drawings attention to the hinged mechanism.
Figure 3:
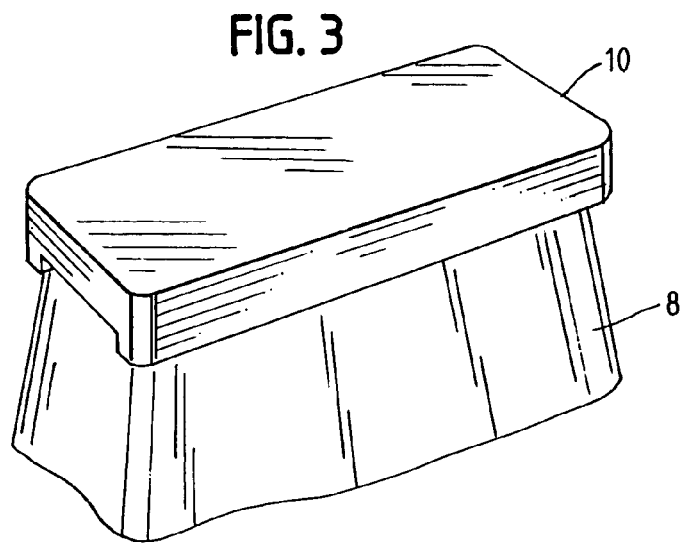
FIG. 3 is a view of the hinged armrest over the vehicle console with the flip under tray stowed and out of view.

The flip under tray 12 is rotated about a hinged mechanism 14 when either in the process of being deployed or stowed. The hinged mechanism 14 is hidden beneath the hinged armrest 10 and is sully usable and unbroken at all times. This hinged mechanism 14 is clearly seen in FIGS. 2, 4, and 5.

The above presents a description of the best mode contemplated for carrying out this invention. The claims should not be read as limited to the described order or elements unless stated to that effect. Therefore, all embodiments that come with the scope and spirit of the following claims and equivalents thereto are claimed as the invention.

What is claimed is:

1. A cell phone storage pocket for a vehicle console comprising:
    a hinged armrest having a first end that is hingedly attached to the vehicle console and a second end opposite to said first end;
    a flip under tray; and
    a hinged mechanism hingedly attaching said flip under tray to said hinged armrest at said second end of said hinged armrest.

2. The cell phone storage pocket as in claim 1, wherein said hinged mechanism is fully usable and unbroken at all times.

3. A cell phone storage pocket as in claim 1, wherein said flip under tray is movable between a deployed position and a stowed position and said flip under tray includes a recessed side for retaining an object on said flip under tray, said recessed side facing away from said hinged armrest when said flip under tray is in its stored position.

4. A cell phone storage pocket as in claim 1, wherein said flip under tray is deployed by lifting open said hinged armrest from said vehicle console and rotating said flip under tray out from said second end of said hinged armrest about said hinged mechanism, once said flip under tray is deployed, said hinged armrest can be placed back in its closed position over said vehicle console; said flip under tray is stowed by lifting open said hinged armrest from said vehicle console and rotating said flip under tray into said hinged armrest about said hinged mechanism, said hinged armrest can then be placed back in its closed position over said vehicle console.

5. A cell phone storage pocket as in claim 4, wherein weight on said hinged armrest will assist in holding said flip under tray in its deployed position.

6. A cell phone storage pocket as in claim 4, wherein said flip under tray in its deployed position is level with said second end of said hinged armrest.

7. A cell phone storage pocket as in claim 5, wherein said flip under tray is abuttingly supported between said hinged armrest and said vehicle console when in the deployed position such that weight on said hinged armrest causes said flip under tray to press down on said vehicle console and push up against said hinged armrest, thereby assisting in holding said flip under tray in its deployed position.

\* \* \* \* \*